CALLENDER & NORTHRUP.

Operating Ordnance.

No. 1,642

Reissued Mar. 29, 1864.

Witnesses.

Wm. Frank Brown

Edw. F. Brown

Inventors.

Mills S. Callender

Nelson W. Northrup

N. PETERS, PHOTO-LITHOGRAPHER, WASHINGTON, D. C.

4 Sheets—Sheet 2.

CALLENDER & NORTHRUP.

Operating Ordnance.

No. 1,642

Reissued Mar. 29, 1864.

Witnesses.

Wm. Frank Brown

Edw. F. Brown

Inventors.

Mills D. Callender

Nelson W. Northrup

N. PETERS, PHOTO-LITHOGRAPHER, WASHINGTON, D. C.

CALLENDER & NORTHRUP.

Operating Ordnance.

No. 1,642. Reissued Mar. 29, 1864.

Witnesses.

Wm. Frank Brown

Edw. F. Brown

Inventors.

Mills G. Callender

Nilson W. Northrup

N. PETERS, PHOTO-LITHOGRAPHER, WASHINGTON, D. C.

CALLENDER & NORTHRUP.

Operating Ordnance.

No. 1,642. Reissued Mar. 29, 1864.

Witnesses.
Wm. Frank Brown.
Edw F Brown

Inventors.
Mills G. Callender
Nelson W Worthing

N. PETERS, PHOTO-LITHOGRAPHER, WASHINGTON, D. C.

UNITED STATES PATENT OFFICE.

JAMES B. EADS, OF ST. LOUIS, MISSOURI, ASSIGNEE, BY MESNE ASSIGNMENTS, OF MILLS L. CALLENDER AND N. W. NORTHRUP.

IMPROVEMENT IN OPERATING ORDNANCE.

Specification forming part of Letters Patent No. 37,935, dated March 17, 1863; Reissue No. 1,642, dated March 29, 1864.

DIVISION B.

*To all whom it may concern:*

Be it known that MILLS L. CALLENDER, of the city, county, and State of New York, and NELSON W. NORTHRUP, of the town of Greene, in the county of Chenango and State aforesaid, did invent certain new and useful Improvements in the Method of Mounting and Operating Heavy Ordnance; and I do hereby declare that the following is a full, clear, and exact description of the same, reference being had to the accompanying drawings, making a part of this specification, in which—

Figure 2:
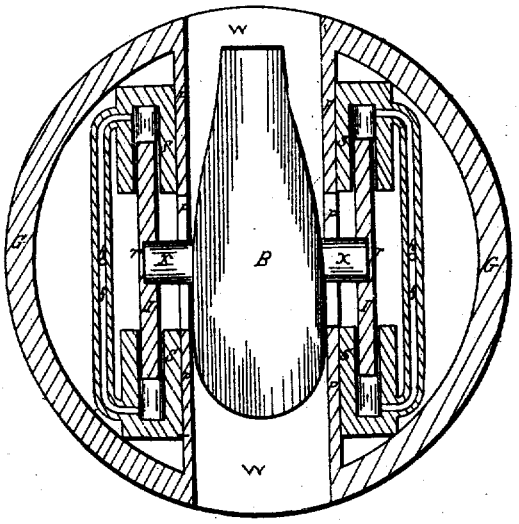
Figure 1:
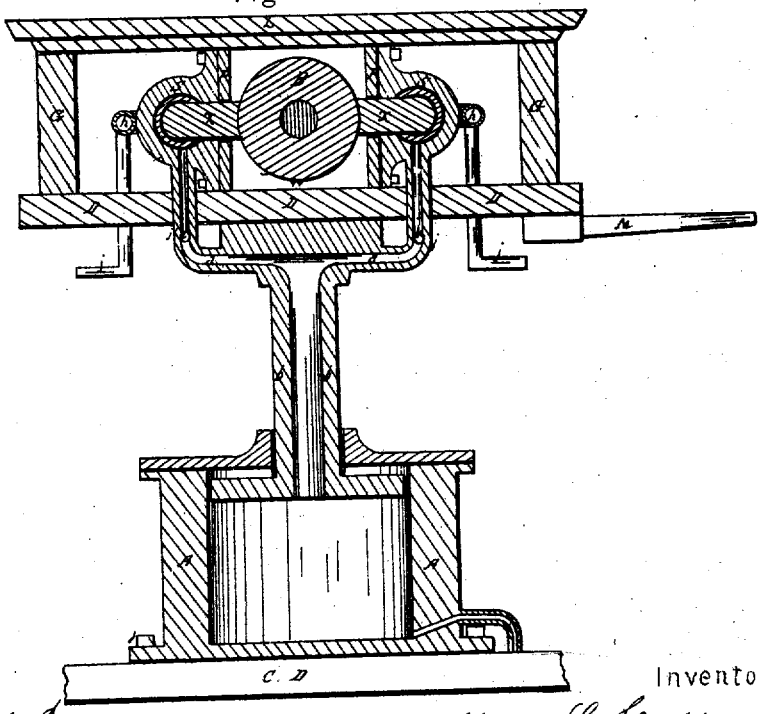
Figure 3:
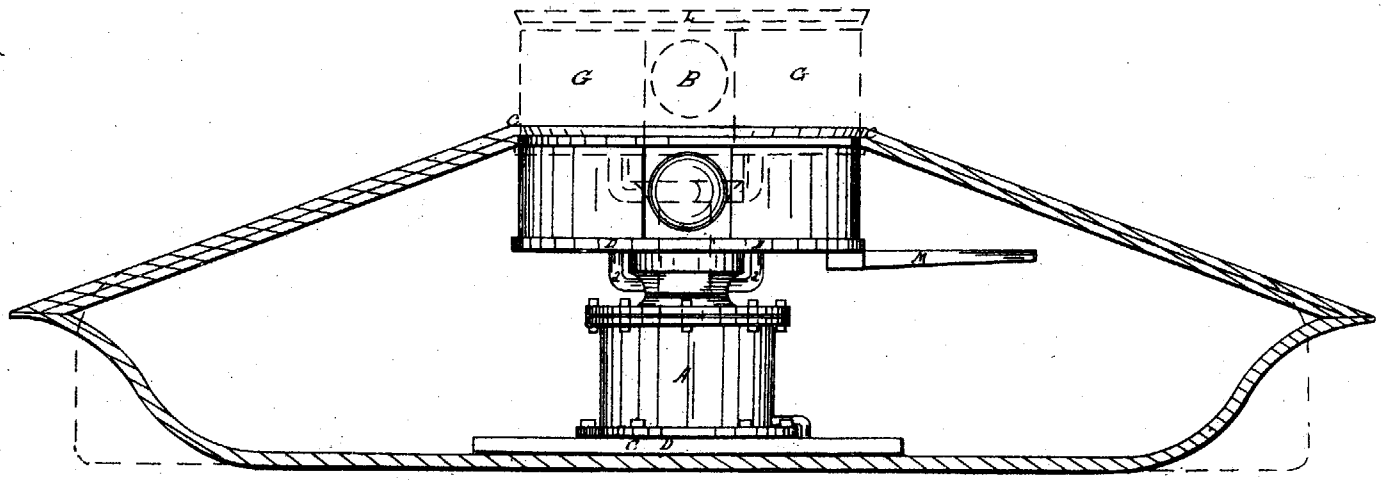
Figure 5:
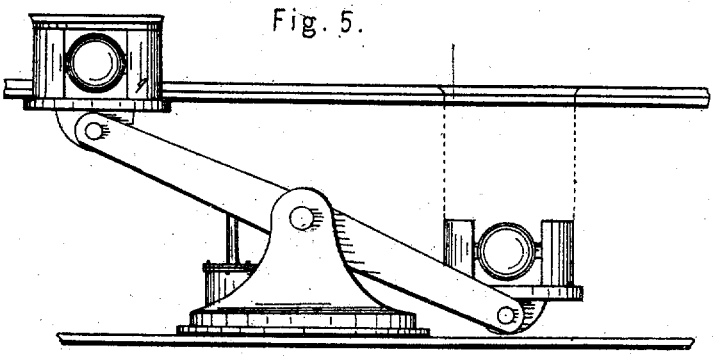
Figure 4:
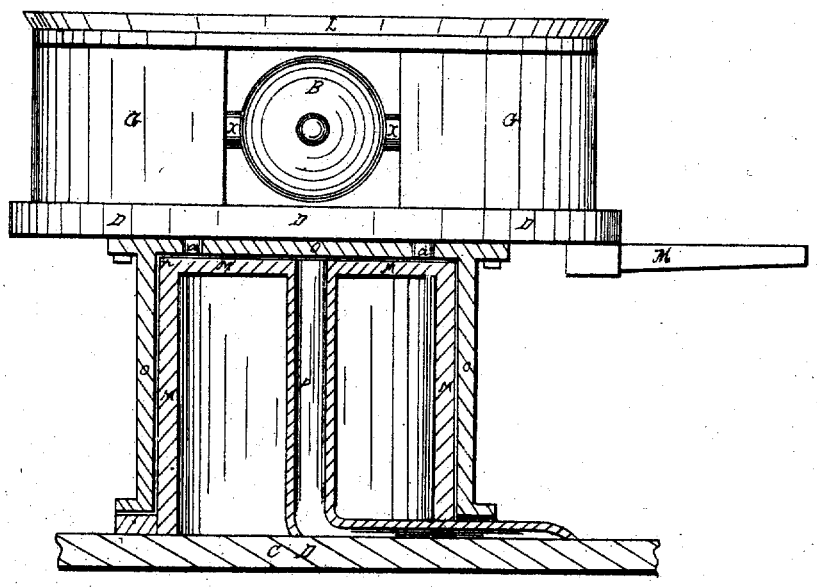
Figure 7:
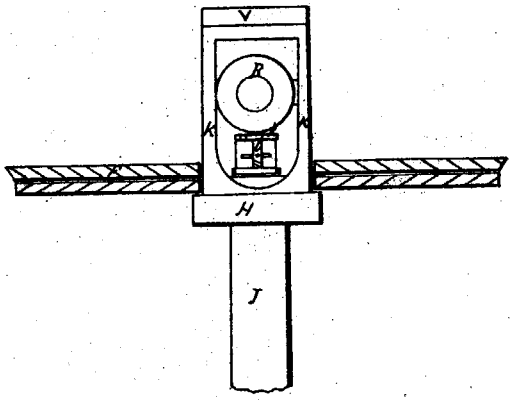
Figure 6:
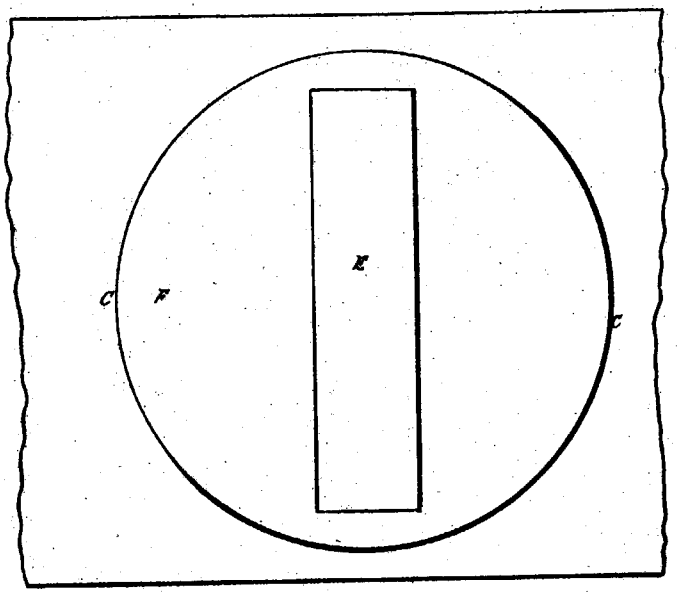

Figure 1 represents a vertical central section through a steam-cylinder, hollow piston-rod, and steam-pipes, and showing the cannon, platform, and shield elevated. Fig. 2 represents a top plan of the platform and piece of ordnance mounted, the top or cover of the shield being removed. Fig. 3 represents a vertical cross-section through a gun-boat or other vessel, with the cylinder and gun depressed for loading in black lines, and as elevated for being discharged in red lines. Fig. 4 represents a modification of the general plan of operating the guns, showing the steam-cylinder and outer case, which latter answers to confine the steam between the heads for the purpose of elevating the shield and the gun. Fig. 5 represents another modification of the mode of elevating and depressing ordnance by steam, two guns being mounted on a balance-frame. Fig. 6 represents a top view of an oblong opening through the rotating plate to admit the ordnance. Fig. 7 represents an end view of a cannon raised up through the oblong opening shown in Fig. 6.

Similar letters of reference, where they occur in the several separate figures, denote like parts in all cases.

The object of this invention is to readily operate heavy ordnance in a shield or tower, which not only protects the gun but also the gunners; and the nature of this part of the invention consists in moving a gun by steam, or its equivalent, back and forth on a line with the axis of the gun, and taking up of the recoil and counter-recoil of the gun by steam or its equivalent.

To enable others skilled in the art to make and use the invention, I will proceed to describe the same in connection with the accompanying drawings.

C D is a bed-plate placed in the bottom of a boat or vessel, Q, of which there may be one or more in such central positions as to balance or trim the vessel, each bed-plate sustaining a gun and shield or tower, with the necessary appliances for operating them, as will be described.

To the bed-plate C D is secured a vertical steam-cylinder, A, as seen in Figs. 1 and 3, having a head and hollow piston-rod, *b*, with two steam-pipes, *a a*, branching off at the top, and extending out at right angles on both sides far enough to pass up through the gun-platform D, and to connect with the two steam-boxes S S, into which the sliding bars I I are fitted steam-tight at both of their ends, leaving a space in their middle portions between the steam-boxes open and free. The sliding bars I I are square, and faced off at both ends to form piston-heads for the steam to operate against, so that they can be moved either way, or held in any position, by the action of the steam passing up through the piston *b b* and steam-pipes *a a* to the steam-boxes S S, the action being regulated by opening and closing the throttle-valves *h h* and *i i* in the connecting steam-pipes *a a* and *f f*, Figs. 1 and 2. The throttle-valves *h h* are operated by rock-shafts *j j*, extending down through the platform D. The valves *i i* are also controlled from underneath. The gun or piece of ordnance B is hung in the boxes T by means of its trunnions X, said boxes being connected to the sliding bars I I, and the bars being cushioned at both ends by the steam in the cylinders, and controlled by the valves *h* and *i*, it can be run forward and held with nearly the whole force of the steam in the boiler, (if necessary,) which steam is to resist the recoil of the gun when fired; or the steam being pressed equally on both ends of the bars I, the recoil will simply be a vibration when the piece is discharged. The platform D is firmly secured upon the head of the piston *b*, so that everything connected therewith is elevated and depressed by the direct action of the steam in the cylinder underneath. The platform is made round and somewhat larger in diameter than the opening *c* in the deck or top of the vessel Q, and is surounded by a shield, G, on both sides, with the exception of the passage or opening W, in which the gun is placed and through which opening it is discharged. The trunnion-boxes, steam-cylinders, and pipes are protected behind the partitions P and within the plating of the shield or tower G, so that they are safe from being injured. The sides of the shield are vertical and high enough to allow of getting the range and distance of the piece, and in diameter it snugly fits the opening *c* in the vessel, and its top is protected by a plate, L, which exactly fits into and closes the opening *c* when the gun is depressed, leaving the top of the covering of the vessel level and smooth. When steam is let into the bottom of the cylinder, the whole arrangement will be raised and rest upon the steam, and in this condition the gun and tower or shield can be turned to cause the gun to bear upon any object with the greatest ease, by means of the lever M, and when the ordnance is elevated by steam to its highest point the platform D will effectually close the opening *c*, through which the tower projects, so that none of the gas and smoke can enter below decks, and the noise and concussion of the report will be very much diminished in its effect upon those on board of the vessel.

By the above-described construction and arrangement guns of the largest caliber can be operated by very few efficient hands, and with the greatest facility and ease. The gunners are not exposed, and while loading are entirely protected by turning the opening in the shield or tower away from the enemy's fire; but the loading may be done entirely below decks, for which purpose the gun and its platform are let down, and the top of the shield being closed, there is no point of access for a shot. The shield and gun need only to be exposed just as the gun is about to be fired, for at other times they may be lowered within the hull of the vessel. When the gun in being raised up from the hold of the vessel by the steam in the vertical cylinder reaches the top of the gun-deck or cover of the vessel, steam may be admitted behind the pistons I, and at the same time that it is being raised it may be run out to be fired and likewise turned around to be aimed. There is nothing to prevent all three of these movements going on at once.

Fig. 4 shows a modified construction of a steam-cylinder for operating heavy ordnance in the manner above described. A substantial base and as large a bearing-surface as possible are necessary to support the platform D, and for this purpose is used an inverted cup as a steam-cylinder, the inside being bored out perfectly smooth, so that the rim or sides *o o* will slide on a steam-tight packing, *n n*, around and over another inverted cup or cylinder, *m m*, the induction of the steam being through the pipe *p* in the center, so that the heads of the two cylinders form the pressure-surface for the steam to act upon to elevate and operate the gun, the steam being conveyed to run the gun out and in, and to take the recoil of the gun when discharged through the pipes *a a*, or passing through the head of the outside cylinder, *m*, and through the platform D.

Figs. 6 and 7 show a modified construction of the opening in the top of the vessel to elevate the ordnance, and saves the lifting of a great amount of the weight, as described in the foregoing plan. The opening E is made oblong through a circular plate, F, of sufficient diameter to admit the gun box or shield K, which fills the opening in the plate when elevated the same as the shield G in the above-described plan shown in Fig. 1. The shield K and its gun and fixtures are balanced upon and secured to the piston-rod J, and may be operated in precisely the same manner as that shown in Figs. 1 and 2, the plate F turning with the armature to bring the gun in range, and can be brought to bear upon any object the same as the round shield G can, and when the gun-carriage K is elevated the base or platform H comes in close proximity with the plate F, so as to close all of the openings while the gun is discharged, and when the gun is depressed the top V is closed level with the surface of the plate and boat. The breech of the cannon B rests upon a movable plate of metal, *k*, under which is placed the jack-screw *l*, so that when the gun recoils the plate *k* may relieve the screw from any strain by sliding easily over it.

What is claimed in this patent as the invention of MILLS L. CALLENDER and NELSON W. NORTHRUP is—

1. The movement of a gun by steam or its equivalent back and forth on a line with the axis of the gun, and the taking up of the recoil and counter-recoil of the gun by steam or its equivlent.

2. Taking the recoil and counter-recoil of the gun upon a cushion of steam in the cylinder or cylinders, which are so connected to the gun as to rise and lower with it, substantially as described.

JAS. B. EADS.

Witnesses:
A. B. STOUGHTON,
EDW. F. BROWN.